Feb. 8, 1955  G. B. LONG  2,701,837
DOMESTIC APPLIANCE
Filed Sept. 5, 1952  8 Sheets-Sheet 1

INVENTOR.
George B. Long
BY Willits Hardman & Fehr
Attorneys

INVENTOR.
George B. Long

Feb. 8, 1955  G. B. LONG  2,701,837
DOMESTIC APPLIANCE
Filed Sept. 5, 1952  8 Sheets-Sheet 4

INVENTOR.
George B. Long
BY *Wilkito Hardman & Fehr*
*Attorneys*

Feb. 8, 1955 G. B. LONG 2,701,837
DOMESTIC APPLIANCE
Filed Sept. 5, 1952 8 Sheets-Sheet 5

INVENTOR.
George B. Long
BY *Willits Hardman and Fehr*
Attorneys

Feb. 8, 1955 G. B. LONG 2,701,837
DOMESTIC APPLIANCE
Filed Sept. 5, 1952 8 Sheets-Sheet 8

INVENTOR.
George B. Long

United States Patent Office 2,701,837
Patented Feb. 8, 1955

2,701,837

DOMESTIC APPLIANCE

George B. Long, Dayton, Ohio, assignor to General Motors Corporation, Dayton, Ohio, a corporation of Delaware Application September 5, 1952, Serial No. 308,011

3 Claims. (Cl. 219—37)

This invention relates to a domestic appliance and more particularly to supporting a heater at different elevations in a deep well cooker of a domestic range.

At present, most domestic electric ranges are provided with deep well cookers. Some cooks do not make very much use of these wells. Therefore, many manufacturers have provided supporting arrangements wherein the heater can be supported either in the usual bottom position or in a top position where it can be used like other surface heaters. While most arrangements are relatively simple, many cooks do not have mechanical ability and have difficulty in changing the heater from the lower position to the upper position and vice versa.

It is an object of my invention to provide an arrangement for changing the heater from one position to another in a manner which can be easily and readily accomplished by cooks without any mechanical skill.

It is another object of my invention to provide an arrangement whereby a simple easily directed manipulation is sufficient to change the heater from one position to another.

It is another object of my invention to provide an arrangement whereby a simple turning of a single crank is sufficient to change the heater from one position to another.

It is still another object of my invention to provide an arrangement whereby the simple lifting and turning of a ring exposed at the top of the well is sufficient to raise the heater from the lower position to the upper position and hold it in place.

These objects are attained in the various forms illustrated. In each of the forms there is provided a well containing a sheathed spiral electric surface heater supported upon a three-pronged burner support. Each of the prongs of the support extend through its own vertical slot in the well. In one form a pulley and winding drum arrangement operated by a crank winds and unwinds a cable to lift the heater and its support from its support at the bottom of the slot to a laterally extending notch in the top of the well which supports the heater in its upper position. In another form, instead of using the cable and crank, a simple cylindrical member having a flanged upper ring engages the projections and lifts the heater up to its upper position after which it is rotated to move the projections into supporting notches. In a third form, a crank is used to rotate a sleeve having separate cam slots for each of the projections so as to cam the projections and the heater from its lower position to its upper position and vice versa.

Further objects and advantages of the present invention will be apparent from the following description, reference being had to the accompanying drawings wherein a preferred form of the invention is clearly shown.

Figure 1:
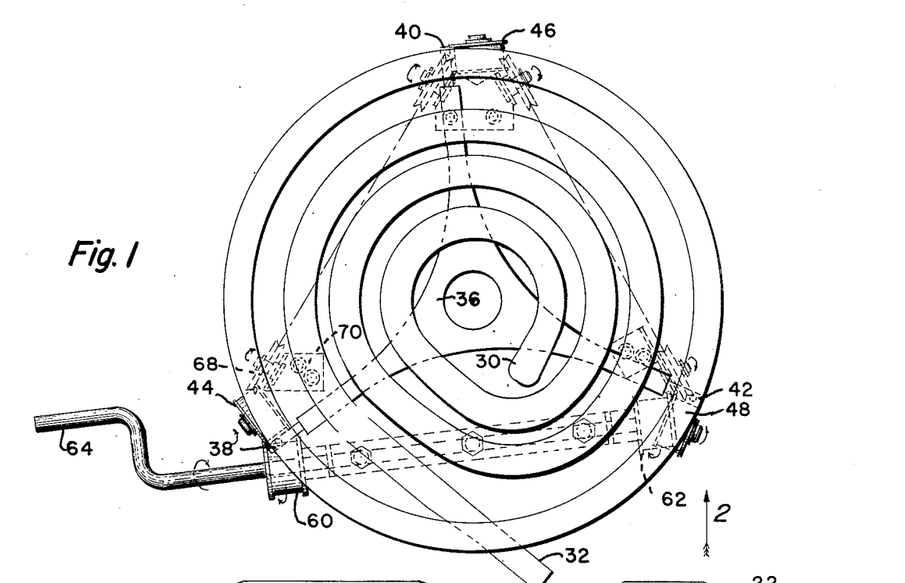
Figure 1 is a top view of a deep well cooker embodying one form of my invention.
Figure 2:
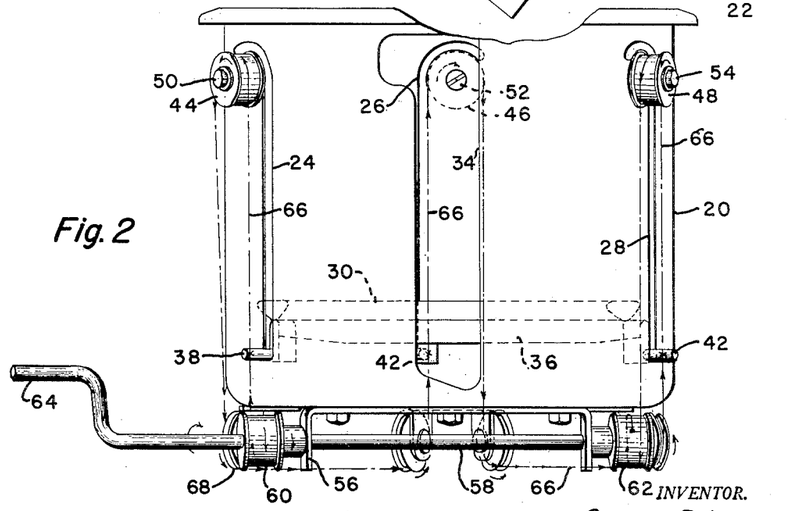
Figure 2 is a view in elevation of the well shown in Figure 1 with the heater shown in its lower position.

Referring now to the drawings and more particularly to Figures 1 to 6, there is shown a well 20 adapted to extend through an aperture in the top of a domestic range with its upper rim 22 resting upon the edge of the range top surrounding the opening. The well 20 is provided with three vertical slots 24, 26 and 28. These slots are spaced equally and are, therefore, 120° apart. Within the well there is provided a sheathed tubular electric heater 30 which is triangular in cross-section and is formed substantially in the shape of a spiral. This heater 30 has a tangential extension 32 extending through a wide slot 34 in the wall of the well 20. The heater 30 is supported by a three-pronged support 36 having projections 38, 40 and 42. These projections 38, 40 and 42 extend respectively through the slots 24, 26 and 28. In Figure 2 these projections 38, 40 and 42 rest upon the bottom of their respective slots. Adjacent the top of these slots 24, 26 and 28 at one side thereof there are provided the pulleys 44, 46 and 48. These pulleys are rotatably mounted on pins 50, 52 and 54 projecting from the wall of the well 20.

Fastened to the bottom of the well 20 is a U-shaped bracket 56 having a crank-shaft 58 rotatably mounted thereon. Upon this crank-shaft 58 adjacent the opposite ends of the bracket 56 there are provided the winding and unwinding pulleys 60 and 62. The crankshaft 58 is provided with an integral crank 64 which preferably projects from one of the walls of the range so that it can be readily operated by anyone desiring to cook.

Figure 4:
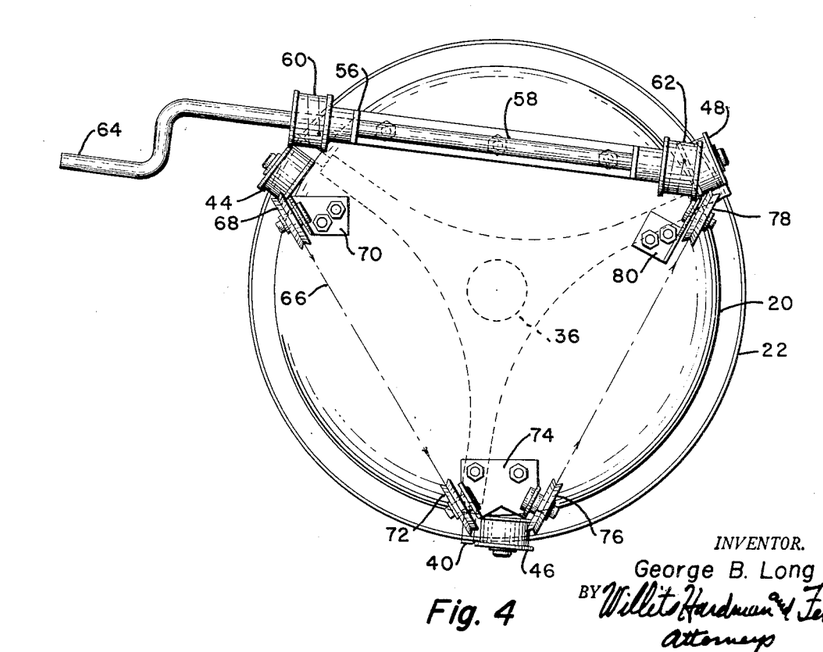
Figure 4 is a bottom view of the well.
Figure 5:
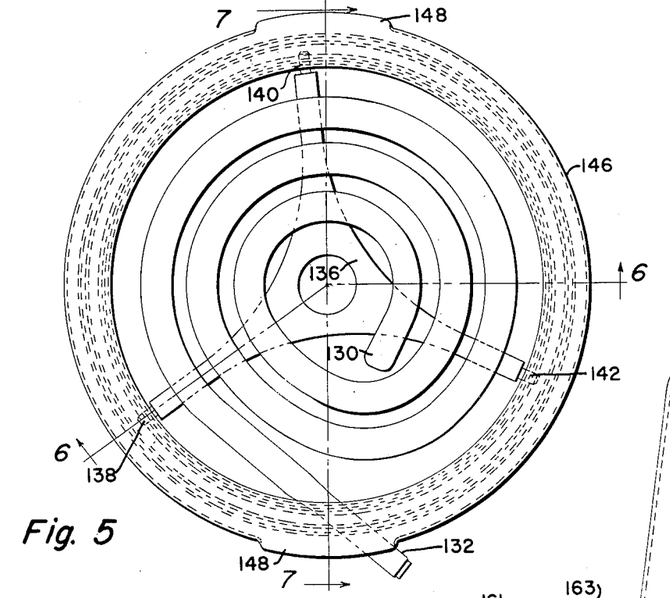
Figure 5 is a top view of a modified form of well.

A cord or cable 66, indicated diagrammatically by a dot and dash line so as to show it more clearly, is wrapped around the drum 60 and fastened thereto. The arrowheads show the direction of movement of the cable in lifting the heater. This cable 66 above the drum 60 is fastened to the projection 38. From the projection 38 the cord or cable extends over the pulley 44 near the top of the well 20 and thence down to a V-groove pulley 68 supported beneath the well 20 upon an angle bracket 70 as shown in Figure 4. From the pulley 68 the cord or cable 66 extends across the bottom of the well 20 to the pulley 72 mounted upon the double brackets 74. From this point the cord or cable 66 extends upwardly and connects to the projection 40.

From the projection 40 the cord or cable 66 extends over the pulley 46 and back down around a second pulley 76 likewise rotatably mounted upon the bracket 74. From the pulley 76 the cord or cable extends across the bottom of the well 20 to a V-groove pulley 78 which is rotatably mounted upon the bracket 80 fastened to the bottom of the well 20. After extending around the pulley 78 through an angle of 90°, the cord or cable 66 extends upwardly and is fastened to the projection 42. From the projection 42 the cord or cable 66 extends upwardly and around the pulley 48 and thence downwardly to the drum 62 upon which it is wound and the terminal is fastened to this drum.

Figure 3:
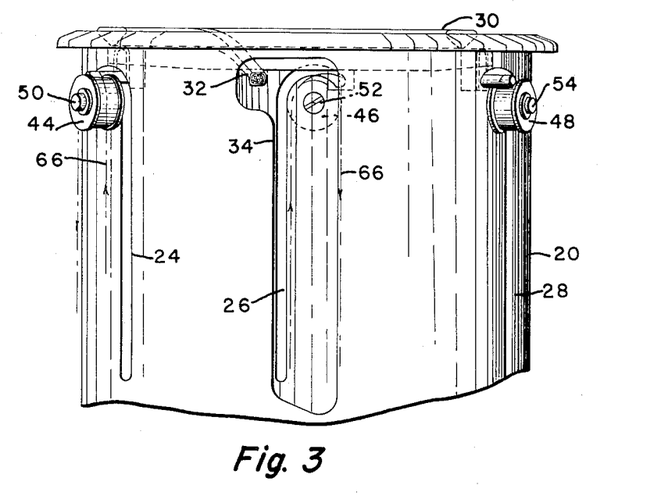
Figure 3 is a view similar to Figure 2 with the heater shown in its upper position but with the pulleys, cranking drums and crank omitted.

The upper portion of the slots 24, 26 and 28 are curved to substantially coincide with the periphery of the pulleys 44, 46 and 48. At their upper ends these slots terminate after extending beyond the top of the arc an equal distance. As shown in Figure 2 the heater 30 is in its lowermost position with the projections 38, 40 and 42 resting upon the bottom of the slots 24, 26 and 28. When it is desired to lift the heater 30 to its uppermost position as shown in Figure 3 the crank 64 is turned to wind the cord or cable 66 upon the drum 62 and to unwind the cord or cable at the same time from the drum 60. This will cause the cord or cable 66 to be pulled over each of the pulleys 44, 46 and 48 at the same speed in equal amounts so that the three projections 38, 40 and 42, to which the cord or cable 66 is attached, will be lifted at the same rate and so remain level at all times. The cord or cable 66 will carry the projections 38, 40 and 42 around the pulleys 44, 46 and 48 in the upper curved portions of the slots 24, 26 and 28 until the extreme upper end portion of these slots is reached. The projections 38, 40 and 42 will be properly supported in the ends of these slots (as shown in Figure 3) since they will rest by gravity upon the end portions. This will stop the cranking of the crank 64 since the cable cannot be further wound upon the drum 62.

To lower the heater 30 from the position shown in Figure 3 to the position shown in Figure 2, the cranking of the crank 64 is reversed so that the cord or cable 66 is unwound from the drum 62 and wound upon the drum 60. This will pull the cord or cable 66 in the opposite direction around the pulleys 44, 46 and 48. This will pull the projections 38, 40 and 42 in the clockwise direction around these pulleys away from the upper end of the slots 24, 26 and 28 and thence down the vertical portions to the lower end of the slots to the position shown in Figure 4. The heater 30 is in a level firmly supported position whether it is in the lower position shown in Figure 2 or in the upper position shown in Figure 3. The manipulation required is exceedingly simple and much more convenient than the arrangements now being used to accomplish the same purpose.

Figure 6:
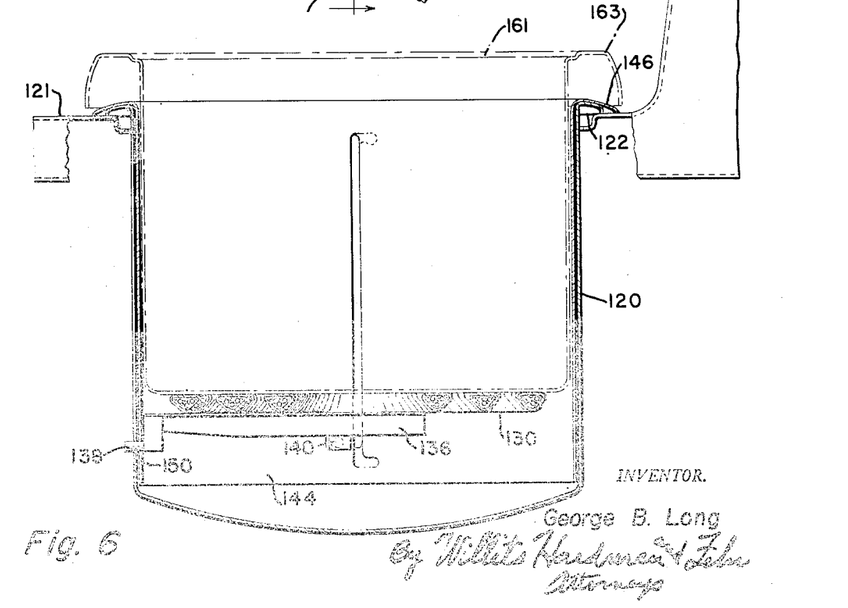
Figure 6 is a view taken along the line 6—6 of Figure 5 showing the heater in its lower position.
Figure 7:
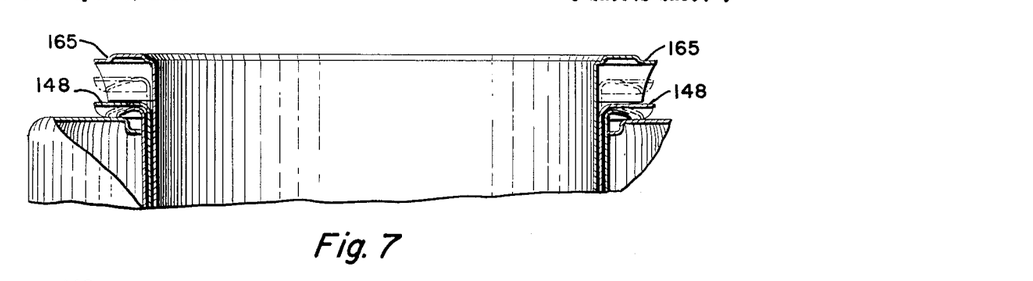
Figure 7 is a fragmentary sectional view taken through the finger gripping portion showing two positions of the lifting member.
Figure 8:
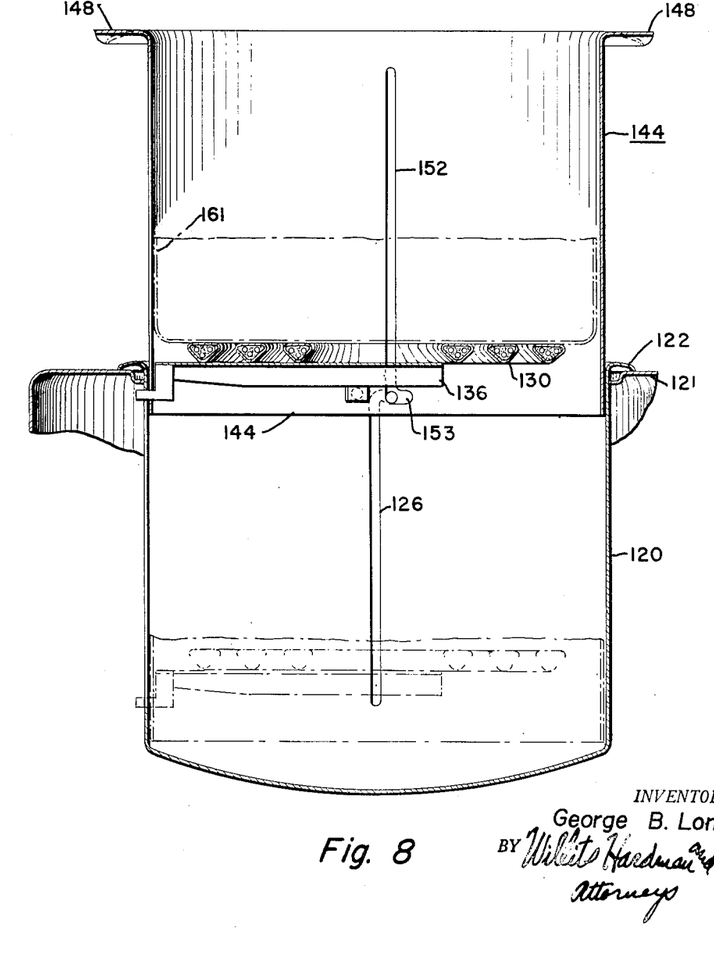
Figure 8 shows the lifting member lifted to its uppermost position carrying the heater with it.
Figure 9:
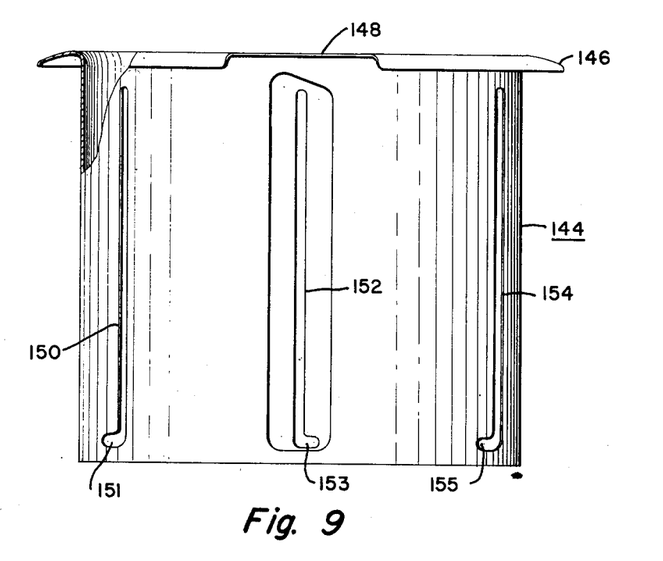
Figure 9 is a view in elevation of the lifting member.
Figure 10:
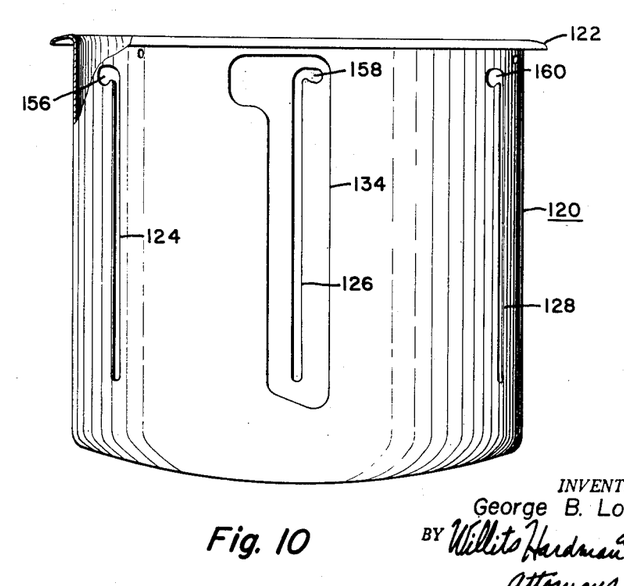
Figure 10 is a view in elevation of the well shown in Figures 6 to 8.

In Figures 5 to 10 there is shown a variation of this arrangement. As shown in Figures 6 and 8 there is shown a well 120 provided with a rim 122 adapted to be supported upon a range top 121. This well is provided with three vertical slots 124, 126 and 128 which are distributed at intervals of 120° about the cylindrical surface of the well 120 so that they are equally spaced. Within the well is a sheathed tubular type of electric heater 130 which is formed substantially through the shape of a flat spiral and is triangular in cross-section. This heater 130 has an end portion 132 extending tangentially through the slot 134 in the wall of the well directly opposite the slot 126. The supply conductors are connected to this terminal 132.

The heater 130 is supported on a three-pronged bracket 136 having projections 138, 140 and 142 which extend through the slots 124, 126 and 128 respectively in the cylindrical wall of the well 120 in a manner similar to the support 36 and its projections in Figures 1 to 4. In the lower position of the heater 130 the projections 138, 140 and 142 rest in the bottom of the slots 124, 126 and 128. This provides a firm support for the heater 130 in the lower position.

Instead of using a cord or cable arrangement to lift the heater 130, I provide a lifting sleeve 144 within the well 120. This lifting sleeve 144 is, of course, coaxially arranged with respect to the well 120 and has a rim 146 which overlaps the rim 122 of the well 120 and likewise engages the range top 121. However, at two diametric specified points, this rim 146 is provided with the raised portions 148. These raised portions 148 are for the purpose of making it possible to insert the fingers in the rim 146 to lift the sleeve 144. However, to keep the rim 146 from projecting materially more than the rim 122 of the well, the raised portions 148 are kept to a minimum in height so that when the rim 146 is down upon the range top 121 the fingers cannot be fully inserted.

To overcome this handicap, the sleeve 144 is provided with three vertical slots 150, 152 and 154 through which extends the projections 138, 140 and 142. Since the slots 150, 152 and 154 are made longer than the slots 124, 126 and 128 in the well 120, the raised portions 148 can be lifted far enough to slip the fingers fully underneath before the sleeve 144 is raised sufficiently that the bottoms of the slots 150, 152 and 154 engage the projections 138, 140 and 142 of the heater supoprt 136. To make it possible to do this without removing the cooking receptacle 161 from its position within the well (as shown in Figure 6) the rim 163 is provided with diametric opposite raised portions 165 which are registered with the raised portions 148 of the rim 146 (as shown in Figure 7).

Thereafter, the sleeve 148 is lifted (as shown in Figure 7) until the projections 138, 140 and 142 strike the upper ends of the slots 124, 126 and 128. The upper ends of these slots 124, 126 and 128 are provided with lateral notches 156, 158 and 160 which extend in the clockwise direction when looking downwardly upon the well 120. When the projections 138, 140 and 142 reach the upper end of the slots 124, 126 and 128, the sleeve 144 is given a slight clockwise turn to move the projections 138, 140 and 142 into the notches 156, 158 and 160 (as shown in Figure 8) where they will be properly supported to support the heater support 136 and the heater 130 in its uppermost position as shown in Figure 8. The sleeve 144 may then be lowered to the position shown in Figure 6 while the heater 130 and its support 136 will remain in its upper position shown in Figure 8. The cooking receptacle 161 may remain supported upon the heater 130 as indicated by dot and dash lines in Figure 8 or it may be removed and another cooking vessel substituted.

To lower the heater 130, the sleeve 144 is lifted until the lower ends of the slots 150, 152 and 154 engage the projections 138, 140 and 142 of the burner support 136, as shown in Figure 8. The sleeve 144 is then turned in a clockwise direction looking downwardly thereon to move the projections 138, 140 and 142 out of the lateral notches 156, 158 and 160. At the same time the projections 138, 140 and 142 are moved into the lateral notches 151, 153 and 155 at the bottom of the slots 150, 152 and 154. The sleeve 144 is then lowered until the projections 138, 140 and 142 reach the bottoms of the slots 124, 126 and 128. The sleeve 144 is then given a slight counterclockwise turn looking downwardly to move the projections 138, 140 and 142 out of the lateral notches 151, 153 and 155 and then lowered to the position shown in Figure 6.

In Figures 11 to 16 a coaxially located sleeve is also used to lift the heater support and the heater from its lower position to its upper position. However, in the form shown in these figures, the sleeve surrounds the well and is rotated by a crank and cable arrangement. This sleeve is provided with three helical cam slots which raise the three projections uniformly as the sleeve is turned.

Referring now particularly to Figures 11 to 16, there is shown a deep well 220 having its rim 222 resting upon and fastened to the range top 221 of the domestic range. The heating element 230 is identical to the heating elements 130 and 30 of the first and second forms and has a terminal portion 232 which projects tangentially through the large slot 234 in one side of the well. The heater 230 is supported by a three-pronged support 236 having projections 238, 240 and 242 which project through the vertical slots 224, 226 and 228 in the walls of the well 220 in the manner similar to the slots in the well 120. In the lower position, the projections 238, 240 and 242 rest upon the bottom of the slots 224, 226 and 228 as shown particularly in Figures 11 to 13.

Rotatably mounted upon the well 220 is the sleeve 244 which surrounds it in a coaxial relationship. The bottom of the sleeve 244 is provided with four bearing supports 275 arranged 90° from each other and extending outwardly at an angle of about 45°. A roller 277 is rotatably mounted upon each of these bearing supports 275. Each of these rollers 277 are adapted to roll upon a track 279 formed in the bottom portion of the well 220 by providing a circumferential V-groove extending around the extreme bottom of the cylindrical portion of the well 220. This provides a vertical rotatable support for the sleeve 244.

Figures 11, 12, 17, 18:
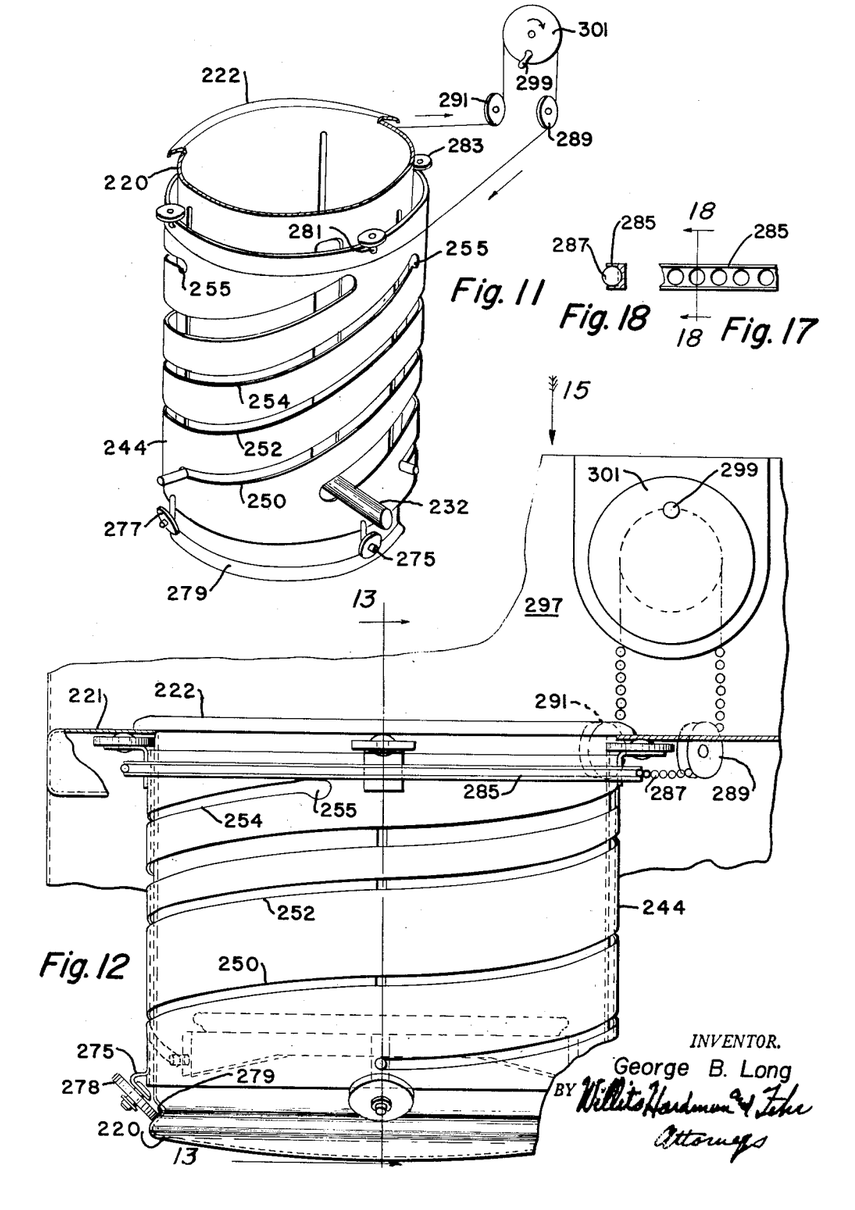
Figure 11 is a perspective view partly diagrammatic of a third form of my invention.
Fig. 12 is a vertical sectional view through a portion of a range showing the third form of my improved deep well cooker.
Figure 17 is a fragmentary enlarged view of the chain groove.
Figure 18 is a sectional view taken along the line 18—18 of Figure 17.
Figure 13:
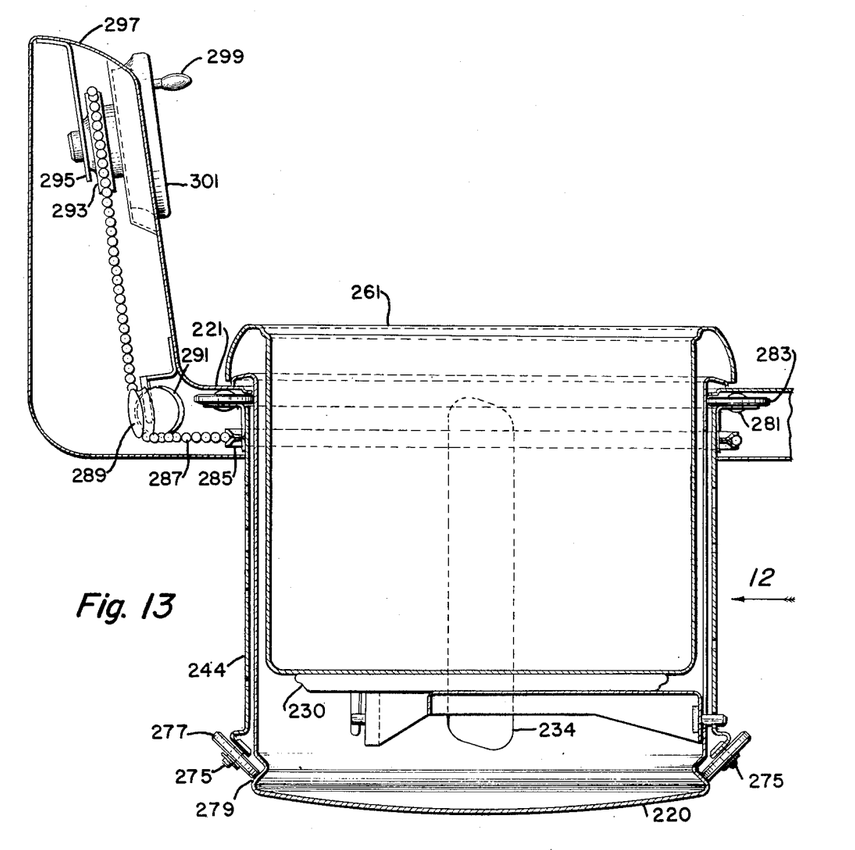
Figure 13 is a sectional view taken along the line 13—13 of Figure 12.

The top of the sleeve 244 is provided with four bearing supports 281 each having rollers 283 rotatably mounted thereon. These rollers roll upon the adjacent cylindrical surface of the well immediately beneath the range top 221. The rollers 277 and 283 keep the sleeve concentric with the well 220 and hold it in position. The sleeve 244 is provided with a circumferential ball chain groove 285 which is fastened to it by welding or soldering. This chain groove receives the ball chain 287. The ball chain 287 may be fastened to the groove 281 at one point, but preferably the groove is provided with wavy edges or notches as shown in Figures 17 and 18 so as to grip the balls of the ball chain to prevent its slippage in the groove 285.

The ball chain extends from the groove 285 over the guide pulleys 289 and 291 to the grooved pulley 293 which is rotatably mounted upon the bracket 295 in the back panel 297 of the range top 221. This pulley 293 is adapted to have waves or projections in its edges to prevent slippage of the ball chain 287 in its groove. The pulley 293 is adapted to be rotated by the crank 299 to rotate the sleeve 244. The pulley 293 is also provided with a dial 301 upon which may be provided legends indicating the direction of rotation for raising or lowering the heater 230.

Figure 14:
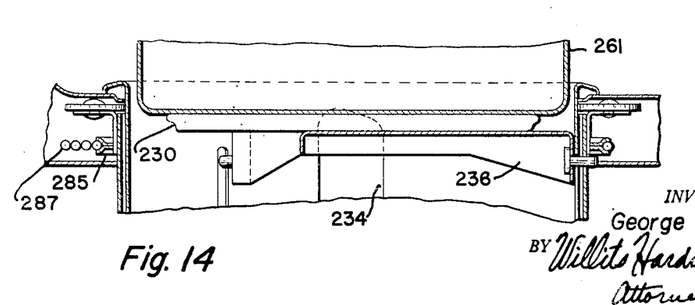
Figure 14 is a fragmentary sectional view similar to Figure 13 but with the heater shown in its upper position.
Figure 15:
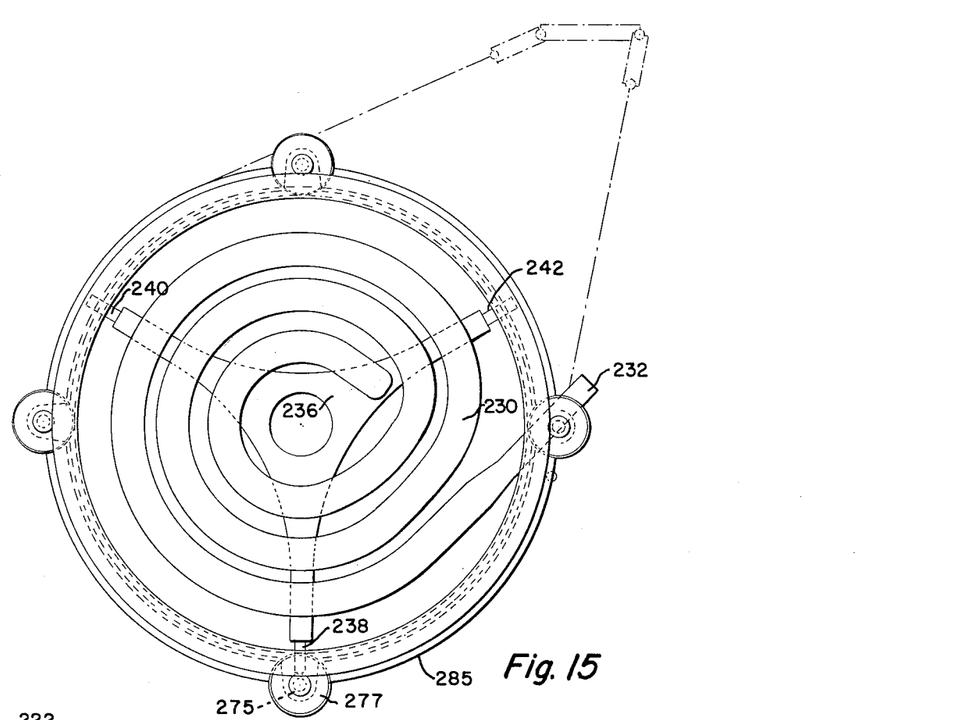
Figure 15 is a top view of the well shown in Figures 13 and 14.
Figure 16:
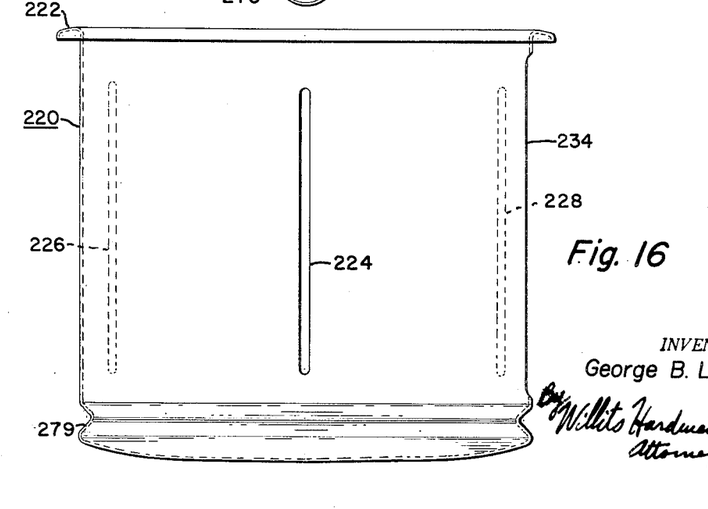
Figure 16 is a view in elevation of the well shown in Figures 13 to 15 inclusive.

The sleeve 244 is provided with three helical cam slots 250, 252 and 254 in a multiple uniformly spaced arrangement. The upper ends of each of the cam slots 250, 252 and 254 are each provided with a notch designated by the reference character 255. When the sleeve 244 is rotated by the crank 299, the cam slots 250, 252 and 254 raise their respective projections 238, 240 and 242 until they reach the notches 255 which will support these projections and the heater firmly in the upper position as shown in Figure 14. The receptacle 261 will be lifted by the heater 230 if it is not removed. The heater 230 can be used in its upper position as long as desired. It may be returned to its lower position illustrated in Figure 12 merely by turning the crank 299 in the opposite direction until the projections 238, 240 and 242 reach the bottoms of their respective slots 224, 226 and 228.

It will, therefore, be seen that in each of these forms of the invention the heater can be raised and lowered by a cook without any mechanical skill. Only the simplest of manipulations is required. Only the simplest of directions are necessary to understand the method of manipulation.

While the form of embodiment of the invention as herein disclosed constitutes a preferred form, it is to be understood that other forms might be adopted as may come within the scope of the claims which follow.

What is claimed is as follows:

1. In combination, a multiple level heating arrangement including a heating unit provided with a plurality of lateral projections, guide means for said projections extending from one level to another, pulley means adjacent the upper portion of said guide means, tension means fastened to each of said projections extending over the pulley means adjacent the upper portion of each of the guide means, and winding means cooperating with said tension means to lift said heating unit, said guide means extending around over the top of said pulley means and being provided with a stop beyond the top of said pulley means.

2. In combination, a multiple level heating arrangement including a heating unit provided with a plurality of lateral projections, guide means for said projections extending from one level to another, pulley means adjacent the upper portion of said guide means, a second set of pulley means below the bottom of the guide means, a winding and unwinding means, tension means having portions extending between and around said pulley means adjacent the upper portion of said guide means and said pulley means below said guide means, said portions also being fastened to the adjacent projections of said heating unit, two end portions of said tension means being connected to said winding and unwinding means for moving said portions up and down to raise and lower said heating unit.

3. In combination, a multiple level heating arrangement including a heating unit provided with a plurality of lateral projections, guide means for each of said projections extending from one level to another, an upper pulley means adjacent the top of each guide means a lower pulley means below each guide means, a first winding and unwinding drum rotatably mounted in tangential alignment with a tangent on the periphery of one of the upper pulley means, a second winding and unwinding drum rotatably mounted in tangential alignment with a tangent on the periphery of another of the upper pulley means, and tension means having one end wrapped around the second drum and extending therefrom alternately over the upper and lower pulley means until the first drum is reached on which the other end is wrapped, and means fastening each projection to the adjacent portion of the tension means located between each upper and lower set of pulley means.

References Cited in the file of this patent

UNITED STATES PATENTS

| | | |
|---|---|---|
| 2,025,252 | Stencell | Dec. 24, 1935 |
| 2,257,580 | Trompeter | Sept. 30, 1941 |
| 2,485,698 | Chesser et al. | Oct. 25, 1949 |
| 2,497,258 | Chesser et al. | Feb. 14, 1950 |
| 2,527,566 | Miller | Oct. 31, 1950 |
| 2,548,158 | Henyan | Apr. 10, 1951 |
| 2,615,118 | Kelly | Oct. 21, 1952 |

FOREIGN PATENTS

| | | |
|---|---|---|
| 427,615 | Italy | Nov. 24, 1947 |